Dec. 6, 1960    J. N. BEEBE    2,963,680
ELECTRICAL REACTANCE DEVICES
Filed March 19, 1956    2 Sheets-Sheet 1

INVENTOR
JOHN N. BEEBE
By Elmer J. Gorn
ATTORNEY

INVENTOR
JOHN N. BEEBE
BY Elmer J. Gorn
ATTORNEY

United States Patent Office 2,963,680
Patented Dec. 6, 1960

2,963,680

ELECTRICAL REACTANCE DEVICES

John N. Beebe, Millis, Mass., assignor to Raytheon Company, a corporation of Delaware Filed Mar. 19, 1956, Ser. No. 572,558

9 Claims. (Cl. 340—1)

This invention relates to an electrical reactance device, and particularly, to a device that can be driven by an alternating current to generate sonic energy and which is adapted, also, to respond to the reflected echos of said sonic energy and function as a wide bandpass voltage amplifying device.

It is known that reactance elements such as crystals, which exhibit piezoelectric phenomena, and magnetostrictive elements can be employed as transducers to convert electrical energy to sonic energy and vice versa. Such devices are commonly referred to as electroacoustic transducers. The crystal elements are considered electrically as inherently capacitive while the magnetostrictive devices are inherently inductive.

The invention discloses a reactance device that incorporates a capacitive transducer for responding to electrical energy to generate sonic energy and for converting reflected echos of said sonic energy into electrical energy. However, it is realized that said capacitive device could be replaced by a special inductive device which exhibits frequency responsive phenomena comparable to that disclosed for said capacitive device and that the new and useful results disclosed herein would also be produced with said inductive device.

The present invention is disclosed in its adaptation to an echo ranging system and is a substitute for the driver stage shown and described in a copending application, Serial No. 326,906, now U.S. Patent No. 2,901,726, granted August 25, 1959. It is believed that the present invention enhances the features of said echo ranging system by providing an output of sonic energy having narrow pulse length and considerable magnitude, upon excitation of the crystal transducer and by providing the receiving element of reflected echos of said sonic energy with wide bandpass characteristics.

To meet the demand for inexpensive echo ranging systems, a single transducer has often been employed as a transmitting and receiving element of such systems. A couple of the major disadvantages of the transmitting aspect of such systems has been the generation of sonic energy with considerable magnitude, and the need to generate such energy in a narrow pulse length in order to achieve good resolution between targets. However, since the resolution of such systems is dependent upon the pulse length of the generated energy, a narrow pulse length giving better resolution, this factor imposed additional requirements on the receiving aspects of such systems; a wide bandpass receiver being required to receive the reflected energy of such a transmitting device.

In the adaptation of the present invention to an echo ranging system, decided performance improvements are discernible and many disadvantages of the prior systems are overcome. The invention can be described as a driver stage during periods when the transducer is excited to transmit sonic energy and as a receiver, having sufficient bandpass to pass the short echo pulses received during periods when returning echos or reverberations are expected. As a driver stage, an alternating current at substantially a preselected natural resonant frequency of the transducer, is generated at predetermined periods by a substantially low-impedance parallel resonant circuit. The low-impedance circuit enables a considerable amount of electrical energy to be stored in a capacitance element during periods when reflected echos are expected, for subsequent excitation of the transducer. This alternating current is coupled to a second parallel resonant circuit, having a higher impedance, which includes the electrical characteristics of the transducer itself. Said second parallel resonant circuit is also substantially resonant to the preselected natural resonant frequency of the transducer. The alternating current in the second circuit excites the transducer to generate sonic energy, having considerable magnitude and a narrow pulse length for propagation into the water medium wherein range information is desirable. A narrow pulse of sonic energy with large magnitude is a desirable output for an echo ranging system since it enables various targets within the range of the propagated energy to be distinguished and even identified. Thus, for example, fish at various depths can be distinguished from each other and from the bottom of the medium. The large pulse amplitude is also useful in obtaining range information in deep mediums and for receiving good target definition at all levels.

The electrical components of the transmitting circuit becomes modified during the period when reflected echos are expected and the circuit can be described as a wide bandpass voltage amplifying device. A wide bandpass receiver is desirable in order to receive the narrow pulse length of transmitted energy without diminution of its magnitude so that accurate range information to the target can be resolved. The components comprising the receiver are selected to bear a particular relationship with the changing electrical characteristics of the transducer in order to present to reflected energy wide bandpass characteristics.

The foregoing and other objects and features of the invention will become apparent from the detailed description of certain embodiments thereof that follows, reference being made to the accompanying drawing wherein.

Figure 1:
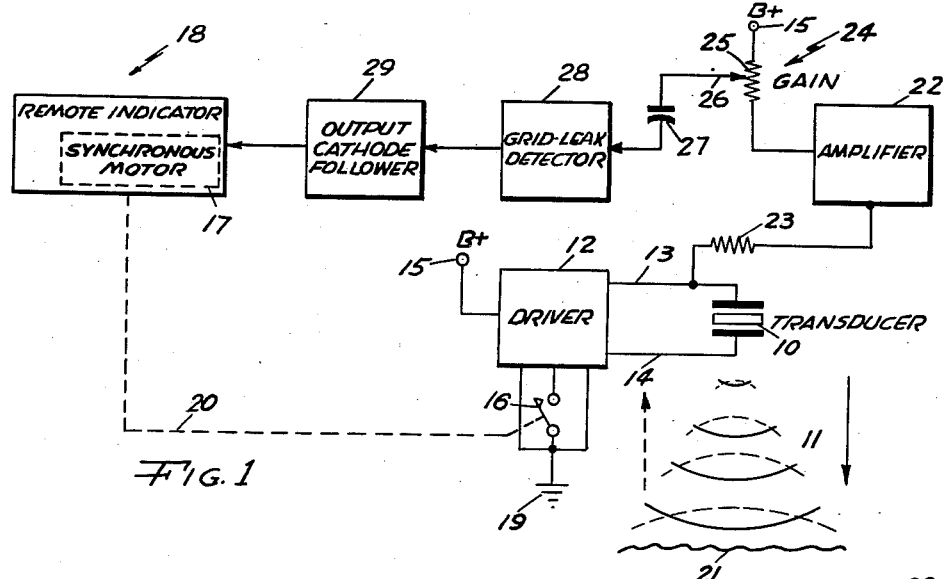
Fig. 1 illustrates the block diagram of an echo ranging system utilizing the invention as the driver therein.

Referring to Fig. 1, the invention is shown as the driver stage of the echo ranging system mentioned previously in the aforementioned copending application.

A transducer 10 is excited to generate sonic energy for propagation into a water medium 11 by a driver stage 12. A pair of leads 13 and 14 couple the transducer 10 to the driver stage. A positive low-voltage B+ supply 15 is used to energize certain of the components comprising the system. A keying device 16, actuated at predetermined periods by a synchronous motor 17, included with a remote indicator 18, provides a discharge path to a common ground 19 for a component of said driver 12. A line 20 signifies that the keying device is energized by the motor. When the keying device is closed, sonic energy is propagated into the medium 11, and this period is referred to as the transmitting period.

Reflected echoes or reverberations from a substantially dense surface, such as a river bed 21, excite the transducer 10 to generate electrical energy. Said electrical energy is coupled to an amplifier 22 through a current limiting resistor 23 having one end thereof attached to the lead 13 side of the transducer 10. A gain control 24, comprised of a potentiometer 25 connected between the positive B+ supply 15 and the amplifier, enables the gain of the amplifier to be adjusted. A wiper arm 26 of the potentiometer is connected to one side of the capacitor 27. The other side of the capacitor is connected to a grid-leak detector 28. In this manner, amplified alternating-current signals are fed to the detector for half-cycle rectification. A cathode follower output stage 29 is coupled to the detector 28 to develop signals for driving the remote indicator 18, whereby the range of returning reverberations can be indicated by comparing the elapse of time between the transmitted sonic energy and the reflected echoes of said sonic energy.

Figure 2:
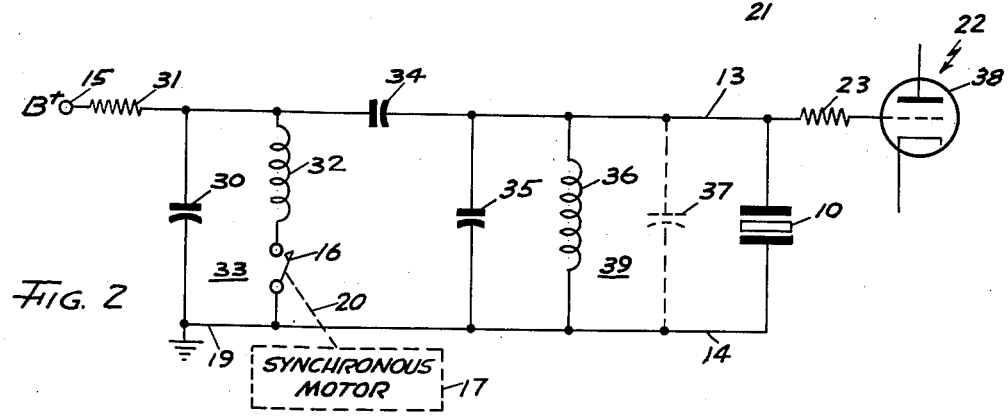
Fig. 2 is a schematic diagram of a low-voltage transducer exciting circuit.
Figure 3:
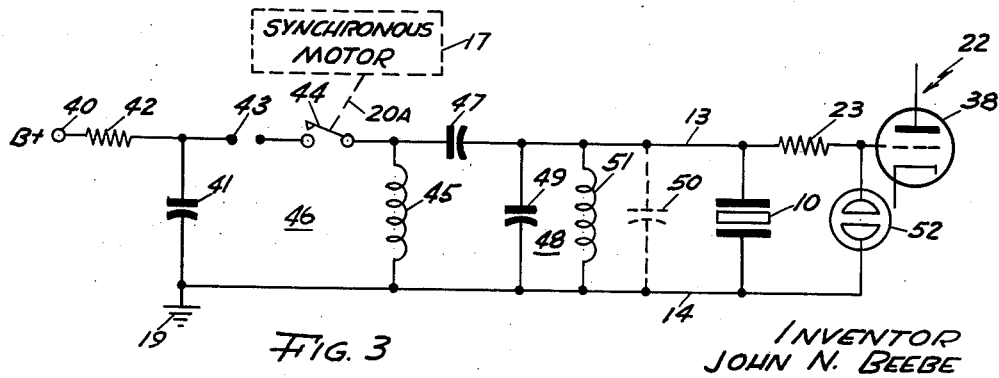
Fig. 3 is a schematic diagram of an alternate high-voltage transducer exciting circuit.

Referring now to Figs. 2 and 3, two exciting circuits or driver stages are shown. Both circuits embody the same electrical principles, but that shown in Fig. 2 is suitable for a low-voltage, positive B+ supply, while the circuit of Fig. 3 is suitable for a high-voltage, positive B+ supply. As shown in Fig. 2, a storage capacitor 30 is charged through a resistor 31 connected to the positive B+ supply 15. The storage capacitor 30 is a substantially large capacitance and the value of the resistor is selected to have said capacitor charge appreciably during periods that reflected reverberations are expected. An inductor 32 has one end thereof connected to the charging side of the storage capacitor 30. The other end of the inductor is connected to a terminal of a normally open keying device 16, which has one side connected to the common ground 19. Said keying device is energized by the synchronous motor 17 and a successful rate for discharging the storage capacitor for a particular echo ranging system has been found to be 10 cycles per second. When the normal open contacts close, the storage capacitor 30, the inductor 32, and the inherent resistive component of the inductor in series with said inductor form a parallel resonant loop 33. The parallel loop 33 is substantially resonant at a preselected natural resonant frequency of the transducer 10.

A coupling capacitor 34 has one side thereof attached to the charging side of the storage capacitor 30. A capacitor 35 and an inductor 36 each have one side thereof attached to the other side of the coupling capacitor 34. The remaining sides of the capacitor 35 and the inductor 36 are connected to the common ground. The crystal transducer 10 is shunt connected across said capacitor 35 and inductor 36 by leads 13 and 14. Said crystal is preferably of the barium titanate type, but other crystals exhibiting the phenomena described herein may be employed. The inherent shunt capacitance of said transducer and that of all other stray shunt capacitances is represented by a capacitor 37. The current limiting resistor 23 couples the ungrounded side of the transducer 10 to a grid of an electron dischage valve 38 comprising the amplifier 22. During the period designated as the transmitting period, the keying device 16 is closed, and the embodiment may be viewed as a parallel resonant loop 33, capacitively coupled to a parallel resonant loop 39. The resonant loop 39 may be said to be comprised of the total capacitance of the capacitors 35 and 37, the inductor 36, and the inherent resistive component of said inductor in series with said inductor. The value of the coupling capacitor 34 is preferably selected so that the parallel loops 33 and 39 are loosely coupled, but more than critically coupled so that the electrical Q of parallel loop 39 is not lowered appreciably. With respect to each other, the parallel loop 33 has a lower impedance than the parallel loop 39. The parallel loop 39 is also substantially resonant to the preselected natural resonant frequency of the transducer 10 to which the parallel loop 33 is made resonant. Loose coupling between the loops 33 and 39 enables a number of alternating current cycles of considerable magnitude to be applied to the transducer over a longer period of time, thereby preventing damage to said transducer by excessive instantaneous values of current. During the period designated as the receiving period the keying device 16 is open, and reflected reverberations are received by the wide bandpass resonant circuit comprised of the inductor 36, its series resistance, and the total capacitance comprised of the sum of the capacitors 35 and 37 connected in parallel and capacitors 34 and 30 connected in series. The values of the components comprising the invention are adjusted to bear a particular relationship to each other in order to excite the transducer to resonate at a particular natural resonant frequency and in order to have the reflected energy look into a wide bandpass receiving device. This relationship is more particularly described subsequently.

Referring now to Fig. 3 the similarities and differences between the low voltage and high voltage exciting circuits can be noted. In this embodiment of the invention, a substantially higher positive B+ supply, 40, is employed. A storage capacitor 41 is charged toward the value of the B+ supply through a substantially large resistance 42. A spark gap 43 has one terminal thereof connected to the charging side of the capacitor 41 and may have another terminal attached to a normally open terminal of a keying device 44. The keying device may be employed in addition to the spark gap 43 or the remaining terminal of said spark gap may be connected to one side of an inductor 45. Said storage capacitor 41 and the inductor 45, with its inherent series resistance, are effectively connected in a parallel loop 46 when sufficient current is stored by said capacitor to discharge across said spark gap and the keying device 16 is closed. Improved regulations of the periods of discharging the storage capacitor is obtained by using the keying device in series with the spark gap. However, an inexpensive device could be operated without the keying device. However, if the keying contact is employed it may be actuated by the synchronous motor 17 as shown by the line 20A.

The capacitor 41 and the inductor 45 are selected to be resonant to substantially a natural resonant frequency of the transducer 10. A coupling capacitor 47 couples the electrical energy generated in the parallel loop 46 to a parallel loop 48 comprised of a capacitor 49 in shunt with the total stray shunt capacitances of the circuitry represented by a capacitor 50 and an inductor 51, having an inherent resistive component in series with said inductor. The value of the coupling capacitor 47 is selected for the same coupling characteristics mentioned previously in order to couple energy from one loop to another during the transmitting period. In addition, the parallel loop 48 is also substantially resonant to the preselected natural resonant frequency of the transducer 10. A neon lamp 52 is attached between the grid of the valve 38 and the common ground in order to limit grid current to a safe value during the transmitting period. During the receiving period, returning reverberations are coupled into a complex wide bandpass resonant circuit comprised of the total capacitance comprised of the sum of capacitors 49 and 50 in shunt with the inductor 51 and connected to the series resonant loop comprised of the coupling capacitor 47 and the inductor 45. Sonic energy, converted to electrical energy by the transducer, is coupled to the grid of the valve 38 across the current limiting resistor 23.

In one successfully operated embodiment of the low-voltage circuit, shown in Fig. 2, a barium titanate transducer 10 was selected that had three frequency modes between 180 and 225 kilocycles. A natural frequency, at which to drive said transducer, was selected to be 200 kilocycles. Thereafter, the value of the storage capacitor 30 was selected to be 0.05 microfarad and the inductor 32 was selected to have a value of 10 microhenries so that the parallel loop 33, comprised of said components, would be resonant to 200 kilocycles and a large amount of current could be stored by a relatively large capacitor.

The coupling capacitor 34 had a value of 0.0033 microfarad and the capacitor 35 had a value of 0.0056 microfarad. The inductor 36, shunt connected across the capacitor 35, had a value of 55 microhenries. In addition, the inherent shunt capacitance of said transducer was found to be 0.0016 microfarad and the capacitance of all other shunt capacitances associated therewith was estimated to be 0.0018 microfarad. Thus, by the proper selection of components, the second parallel loop 39, comprised of the inductor 36 and the sum of the capacitors 35 and 37, was also made substantially resonant to the preselected natural resonant frequency of the transducer. The keying device 16 was energized by the synchronous motor 17 ten times per second.

Each time the keying device 16 closed, a damped oscillatory wave train at a frequency of 200 kilocycles was generated by the parallel loop 33 as the capacitor 30 discharged through the inductor 32. In addition, with the proper selection of the coupling capacitor 34 and the components comprising the parallel loop 39, a voltage build up was found to occur in the parallel loop 39 and the entire loop oscillated at a frequency determined by the lowest resistance and the highest electrical Q of the transducer itself. It is thought that the voltage build up occurring in the parallel loop 39 is due to the impedance transformation taking place between the parallel loop 33 and said loop 39 with the proper coupling between said loops; said parallel loop 33 being a lower impedance than the parallel loop 39. The oscillations occurring in the parallel loop 39 excite the transducer to vibrate and narrow pulses of source energy are propagated into the medium. The pulses of sonic energy developed were found to comprise as many as five cycles of oscillations increasing in amplitude to a peak value and approximately five cycles of decreasing values thereafter. The pulse length was found to be between 40 and 50 microseconds with a center frequency in the vicinity of the preselected natural resonant frequency of the transducer.

During the receiving period, the inductor 32 is not a part of the receiving circuit, which comprises the transducer 10, the inductor 36, and the total capacitance of the capacitors 35 and 37 in parallel and the capacitors 34 and 30 in series. A voltage build up of approximately 15 decibels was measured for received reflected sonic energy. Sail voltage build up may be said to describe a resonant circuit having an electrical Q of approximately 30.

A possible explanation of the receiving circuit may be realized if the circuit is visualized as the inductor 36 shunted connected with a variable capacitor representative of the total shunt capacitance of the receiving circuit and also the equivalent shunt capacitance of several series resonant circuits that can be drawn to represent the various resonant frequency modes of the transducer itself. Due to the characteristics of parallel resonant circuits, the selectivity of the response curve of a particular circuit increases with the impedance of the circuit. The impedance of such a circuit at a particular frequency may be expressed by the equation:

$$Z_t = \frac{L}{RC}$$

where R is the inherent series resistance of an inductor L, and C is the capacitor in shunt with said inductor. It is obvious that if the value of the shunt capacitance C changes, a resulting change in the impedance of the circuit takes place at a particular resonant frequency, and, furthermore, if the value of said capacitance decreases, the resonant circuit becomes more selective. It is believed that the electrical characteristics of the transducer are such that it can be considered as a generator of variable capacitance over a substantial portion of its bandpass and that the decrease of said capacitance at certain frequencies is responsible for increasing the impedance of the circuit at said frequencies. Thus, over the bandpass of the transducer, there exists several discrete selective resonant circuits having center frequencies that are close to one another so that overlapping of the response curves occurs. Furthermore, viewed in its entirety, the receiving circuit can be considered as a wide bandpass device comprised of several selective resonant circuits.

Figure 4:
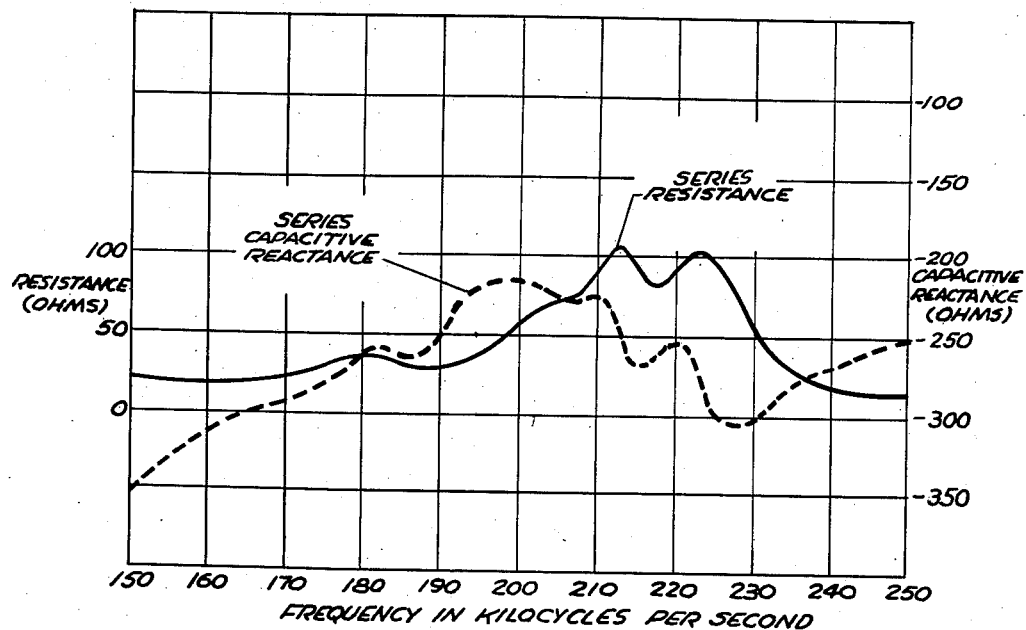
Fig. 4 is a graph of the electrical characteristics of a piezoelectric type crystal such as barium titanate.

The graph shown in Fig. 4 depicts the typical characteristics of a barium titanate transducer which is similar to the transducer employed in the embodiment of the invention. The series resistance and series capacitive reactance of the transducer are plotted against frequency. It can be seen that the transducer exhibits abnormal capacitive reactance values in the vicinity of 185, 200 and 215 kilocycles. Ordinarily, it is expected that capacitive reactance will decrease with frequency. However, these results indicate that the expected results do not occur. Although the graphical values are representative of series resistance and series capacitive reactance, the shunt capacitance of this circuit will also vary with frequency as unexpectedly as the series reactance. At each of the frequencies where the series capacitive reactance increases in value instead of decreasing, the shunt capacitance of the transducer can be said to decrease. It follows then, that with the proper selection of the inductor 36 and the other shunt capacitances of the circuit, at these particular frequencies where the effect of the transducer is abnormal, the circuit may be described as comprising several selective overlapping resonant circuits giving the overall effect of a wide bandpass device. Thus, the decrease of shunt capacitance of said transducer satisfies the requirement for selectivity in accordance with the aforementioned equation. The value 30 mentioned earlier for the electrical Q of the receiving circuit can be thought of as a mean value of all the individual resonant circuits that exist when the transducer is excited by reflected sonic energy. In addition, it is worthwhile to point out at this point that the receiving element of this invention has a sufficient bandpass to enable the short pulse echoes to be received exceptionally well. Thus, echoes from small targets such as fish at separate depth may be discerned readily, and the system may be said to have good target resolution.

In essence, what has been described is a device capable of generating large magnitudes of sonic energy having a narrow pulse length and a frequency determined by the parameters of the transducer employed, also, a receiving device having wide enough bandpass characteristics to receive reflected sonic energy distributed on said transducer with ensuing good target resolution.

In one successfully operated embodiment of the high-voltage circuit, shown in Fig. 3, a transducer was selected that had similar characteristics to those described for the low-voltage device. A natural resonant frequency of the transducer was also selected to be 200 kilocycles. The storage capacitor 41 and the inductor 45 comprising the parallel loop 46 were made resonant to 200 kilocycles by making the capacitor 0.05 microfarad and the inductor 10 microhenries. The capacitor was charged through a one megohm resistor 42 from a positive 2400-volt B+ supply 40. The spark gap 43 was selected to allow the storage capacitor 41 to discharge when the capacitor charged to 2,000 volts. The synchronous motor 17 was employed for better regulation of the periods of discharge of the storage capacitor 41 and it energized the keying device 44 ten times per second. The coupling capacitor 47 had a value of 0.005 microfarad, while the capacitor 49 had a value of 0.003 microfarad. The inductor 51, in shunt with said capacitor 49, had a value of 60 microhenries. The shunt capacitance represented by the capacitor 50 was not determined, but it is believed that it had the same value mentioned for the capacitor 37.

It was determined that the storage capacitor 41 discharged in one half-cycle through the keying device 44 and the inductor 45. When the storage capacitor 41 is charged to 2,000 volts, this represents an energy storage of 0.1 watt second. However, since said storage capacitor 41 and the inductor 45 are resonant to 200 kilocycles, one half cycle is equal to 2.5 microseconds. The discharge of 0.1 watt second in said 2.5 microseconds is equivalent to a half cycle pulse of 40 kilowatts; naturally, this figure is relative since the storage capacitor does not discharge completely.

If the loaded electrical Q of the parallel loop 48 is adjusted so that ten useful cycles result, and the largest part of the 40-kilowatt pulse is spread among these ten cycles, the average power for these cycles will be approximately 2 kilowatts. In fact, it has been found that a voltage buildup occurs when energy is coupled from the loop 46 to the loop 48 for the same reasons advanced in the discussion of the low-voltage circuit. With the proper selection of the value of the coupling capacitor 47, and the components of the parallel loop 48, more than critical coupling can be obtained between the loops 46 and 48 without lowering the electrical Q of the loop 48 too much. When the proper values are obtained, sonic energy is generated at a frequency determined by the electrical resonance of the transducer itself. The electrical resonance appears to occur at the lowest resistance and the highest electrical Q of the transducer. In addition, whereas the energy coupled to the second parallel loop 39 in the low-voltage circuit was a damped oscillatory wave train, the energy coupled to the second parallel loop 48 in this embodiment seemed to be sharply cut off after several cycles. It appeared that the number of cycles which occur before cutoff was dependent upon the amount of coupling between the loops 46 and 48 and the electrical Q's of the transducer and all other LC circuits involved.

The sonic energy generated by this embodiment of the invention was found to have a center frequency of 190 kilocycles, a pulse length of 50 microseconds, and a magnitude between one and two kilowatts. The center frequency recorded seems to substantiate the analysis that the frequency of the output is determined by the electrical characteristics of the transducer. The values obtained for pulse length and large magnitude illustrate the desirable features obtained by incorporating the invention as the driver stage in an echo-ranging system.

The receiving circuit of the high-voltage circuit is slightly different from that of the low-voltage circuit, but it is believed that it functions as a wide bandpass receiving device for the same reasons advanced for said low-voltage circuit. Said receiving circuit is comprised of the inductor 51 in shunt with the total shunt capacitance of the circuit and that of the transducer, at any particular frequency, and the series arrangement of the coupling capacitor 47 and the inductor 45.

The values of components comprising said receiving circuit have likewise been chosen to take advantage of the decrease of shunt capacitance of the transducer over substantial portions of the bandpass of said transducer in order to present to reflected narrow pulse echoes, a wide bandpass circuit, comprised of individually selective resonant circuits which occur at the frequencies of resonance of said transducer.

This completes the description of the particular embodiments of the invention. Many uses and modifications of the invention will present themselves to persons skilled in the art without departing from the spirit and scope of the principles disclosed herein. For this reason, it is desired that the invention be given a broad interpretation. It is realized that said principles can also be employed to design an apparatus around an inductive device, such as a magnetostrictive transducer, if said device can be made of laminations responsive to several resonant frequencies in the same manner as the capacitive device disclosed herein. Accordingly, it is desired that this invention not be limited by the particular components employed herein, except as defined by the dependent claims.

What is claimed is:

1. In combination, a source of direct energy, a first circuit including an energy storage device for storing energy from said source directly connected to said source, a second circuit including a transducer, a coupling circuit for directly connecting said first and said second circuits, means for discharging said energy whereby said first circuit, said second circuit, and said coupling circuit operate as a single, resonant network for producing sonic energy the frequency of which is controlled by the reactance of said transducer.

2. In combination, a source of direct energy, a first parallel circuit including an energy storage device for storing energy from said source directly connected to said source, a second parallel circuit including a transducer, a coupling circuit for directly connecting said first and said second parallel circuits, means for discharging said energy whereby said first parallel circuit, said second parallel circuit, and said coupling circuit operate as a single, resonant network for producing sonic energy the frequency of which is controlled by the reactance of said transducer.

3. In combination, a source of direct energy, a first parallel circuit including an energy storage device for storing energy from said source directly connected to said source, a second parallel circuit including a piezo-electric transducer, a coupling circuit for directly connecting said first and said second parallel circuits, means for discharging said energy whereby said first parallel circuit, said second parallel circuit, and said coupling circuit operate as a single, resonant network for producing sonic energy the frequency of which is controlled by the reactance of said piezo-electric transducer.

4. In combination, a source of direct energy, a first parallel circuit including a capacitive energy storage device for storing energy from said source and an inductance directly connected to said source, a second parallel circuit including a transducer, a coupling circuit for directly connecting said first and said second parallel circuits, means for discharging said energy, whereby said first parallel circuit, said second parallel circuit, and said coupling circuit operate as a single, resonant network for producing sonic energy the frequency of which is controlled by the reactance of said transducer.

5. In combination, a source of direct energy, a first parallel circuit including an energy storage device for storing energy from said source and a first inductance directly connected to said source, a second parallel circuit including a capacitance, a second inductance, and a transducer, a coupling circuit for directly connecting said first and said second parallel circuits, means for discharging said energy, whereby said first parallel circuit, said second parallel circuit, and said coupling circuit operate as a single, resonant network for producing sonic energy the frequency of which is controlled by the reactance of said transducer.

6. In combination, a source of direct energy, a first low impedance parallel circuit including an energy storage device for storing energy from said source directly connected to said source, a second high impedance parallel circuit including a piezo-electric transducer, condenser means for directly coupling said first and said second parallel circuits, means for discharging said energy, whereby said first parallel circuit, said second parallel circuit, and said condenser means operate as a single, resonant network for producing sonic energy the frequency of which is controlled by the reactance of said piezo-electric transducer.

7. In combination, a source of direct energy, a first low impedance parallel circuit including an energy storage device for storing energy from said source directly connected to said source, a second high impedance parallel circuit including a transducer, a coupling circuit for directly connecting said first and said second parallel circuits, means for discharging said energy, whereby said first parallel circuit, said second parallel circuit, and said coupling circuit operate as a single, resonant network for propagating sonic energy into a medium over a first period of time, switching means for disabling a portion of said first parallel circuit over a second period of time, combined means, including said second parallel circuit, said coupling circuit, and the portion of said first parallel circuit not disabled, responsive to said sonic energy reflected from an object means in said medium for producing electrical energy during said second period of time.

8. In combination, a source of direct energy, a first low impedance parallel circuit including a capacitive energy storage device for storing energy from said source and an inductance directly connected to said source, a second high impedance parallel circuit including a transducer, a coupling circuit for directly connecting said first and said second parallel circuits, means for discharging said energy, whereby said first parallel circuit, said second parallel circuit, and said coupling circuit operate as a single, resonant network for propagating sonic energy into a medium over a first period of time, switching means for disabling said inductance of said first parallel circuit over a second period of time, combined means, including said second parallel circuit, said coupling circuit, and said capacitance of said first parallel circuit, responsive to said sonic energy reflected from an object means in said medium for producing electrical energy during said second period of time.

9. In combination, a source of direct energy, a first low impedance parallel circuit including an energy storage device for storing energy from said source directly connected to said source, a second high impedance parallel circuit including a transducer, a coupling circuit for directly connecting said first and said second parallel circuits, means for discharging said energy, whereby said first parallel circuit, said second parallel circuit, and said coupling circuit operate as a single, resonant network for propagating into a medium over a first period of time a pulse of sonic energy the frequency of which is controlled by the reactance of said transducer, switching means for disabling a portion of said first parallel circuit over a second period of time, combined means, including said second parallel circuit, said coupling circuit, and the portion of said first parallel circuit not disabled, responsive to said pulse of sonic energy reflected from an object means in said medium for producing electrical energy during said second period of time.

References Cited in the file of this patent

UNITED STATES PATENTS

| | | |
|---|---|---|
| 1,450,246 | Cady | Apr. 3, 1923 |
| 2,410,065 | Harrison | Oct. 29, 1946 |
| 2,416,337 | Mason | Feb. 25, 1947 |
| 2,491,020 | Winchel | Dec. 13, 1949 |
| 2,561,851 | Fryklund | July 24, 1951 |
| 2,738,487 | Hackley | Mar. 13, 1956 |

FOREIGN PATENTS

| | | |
|---|---|---|
| 1,087,922 | France | Sept. 1, 1954 |

OTHER REFERENCES

Terman: "Radio Engineering," 3rd ed., 1947, McGraw-Hill, p. 68.